United States Patent [19]

Binter

[11] Patent Number: 5,312,491

[45] Date of Patent: May 17, 1994

[54] RUST INHIBITING COMPOSITIONS AND METHODS FOR PROTECTING METAL SURFACES WITH SAME

[76] Inventor: Randolph K. Binter, 928 Fernwood, Moorestown, N.J. 08057

[21] Appl. No.: 894,953

[22] Filed: Jun. 8, 1992

[51] Int. Cl.$^5$ .............................................. C23C 22/00
[52] U.S. Cl. .................................... 148/240; 148/251; 148/272; 148/273; 148/274
[58] Field of Search ............... 148/240, 251, 272, 273, 148/274

[56] References Cited

U.S. PATENT DOCUMENTS

| | | | |
|---|---|---|---|
| 4,020,106 | 6/1977 | Ackerly et al. | 260/566 |
| 4,304,707 | 12/1981 | John | 260/37 R |
| 4,613,384 | 9/1986 | John | 148/274 |
| 4,725,320 | 2/1988 | Tury et al. | 148/273 |
| 4,865,647 | 9/1989 | John et al. | 106/14.15 |
| 5,047,094 | 9/1991 | Tury et al. | 148/248 |

OTHER PUBLICATIONS

Roman Haas Company, "Experimental Rheology Modifier QR-708", Polymers, Resins and Monomers, (1987).
ICI Resins US, "Anticorrosive Agent", ATrust RC50, (Jan. 31, 1991).
ICI Resins US, "Vinyl Acrylic Copolymer Emulsion", Haloflex 202S, (Jan. 2, 1990).
Corrosion 91, "Novel Applications of Co-Ordination Complexes" (Mar., 1991), Cincinnati, Ohio.

*Primary Examiner*—Richard Dean
*Assistant Examiner*—Robert R. Koehler
*Attorney, Agent, or Firm*—Woodcock Washburn Kurtz Mackiewicz & Norris

[57] ABSTRACT

Rust inhibiting compositions having improved elasticity properties are provided. The compositions contain oxime based rust converter compounds formulated with a latex based paint to provide a flexible film coating that acts as a barrier to oxygen and water vapor diffusion to the metal surface. Methods for applying the rust inhibiting compositions to metal surfaces are also provided.

24 Claims, No Drawings

RUST INHIBITING COMPOSITIONS AND METHODS FOR PROTECTING METAL SURFACES WITH SAME

FIELD OF THE INVENTION

The invention relates to compositions and methods for inhibiting rust upon metal surfaces. Specifically, the invention relates to compositions, which when applied to a metal surface, form flexible, elastic coatings having an conditions.

BACKGROUND OF THE INVENTION

Various formulations have been used by industry to provide barrier coatings for metal surfaces to protect those surfaces from corrosion and rust. Recently, formulations have included compounds called "rust converters" which are primarily based upon tannic or phosphoric acids, along with various other acids well known in the art. However, these acid compounds are susceptible to leaching and thus the protection is lost. Oxime based rust converter compounds have replaced the tannic and phosphoric acid compounds in rust inhibiting compositions due to their superior rust converting properties.

The formulations presently utilized to protect metal surfaces contain the rust coverter compounds in a base coating system. Typically this system is a latex base paint, however other resin base systems are known. These latex base paint systems are formulated with relatively high levels of "fillers", that is, compounds such as dyes, pigments, clays, carbonates, talc, phosphates, titanium dioxides, whiting agents, iron oxides, sulfates, silica, and the like. These fillers serve various functions, however they also severely restrict the elastic properties of the coating once it is applied to the metal surface. The coating is then prone to cracking and peeling upon exposure to ambient environmental conditions. Therefore, the coating will fail to protect the surface at the crack areas, and those areas proximate thereto, causing the surface to rust and corrode.

The formulations currently used to protect metal surfaces from rust and corrosion, containing high amounts of fillers, also present severe environmental and worker safety problems associated with their use. Removal of these formulations when they begin to crack and peel requires either chemical solvents or extensive amounts of labor in the form of sanding and sandblasting. The resulting waste from these processes is either toxic, volatile, or a combination of both and is therefore undesirable.

A critical need therefore exists to provide a rust inhibiting and corrosion resistant formulation that has superior elasticity properties such that it will not crack or peel upon exposure to ambient environmental conditions. Also, techniques are required for applying the coating to the surfaces to provide for ease of removal while avoiding toxicity or volatility problems.

SUMMARY OF THE INVENTION

The present invention provides for a rust inhibiting composition that provides a flexible, durable coating upon a metal substrate surface. The composition contains a base carrier fluid that is preferably a latex based paint. The composition also contains a rust converter that is an oxime based compound. The composition may also contain at least one additive such as a rheology modifier, teflon, a lubricity additive, a surfactant, zinc oxide, ammonia, defoamers, and an ultraviolet protectant. The composition, when applied to a metal substrate surface, forms a flexible, elastic coating that is characterized by having a yield strength that is greater than the stress induced upon the coating by the deformation of the substrate. The flexibility of the coating is obtained by formulating the composition such that it contains a low amount of fillers.

The present invention also provides for methods of applying the composition to the metal substrate surface. In a preferred embodiment, a mesh screening is placed onto the metal surface wherein the mesh screening is saturated with the composition. This saturation can be accomplished by (1) coating the metal surface with the composition and then applying the mesh screening and optionally applying another coating of the composition; (2) applying the mesh screening to the metal surface and coating the screening and surface with the composition; or (3) by wetting the screening with the composition and applying this wetted screening to the metal surface.

DETAILED DESCRIPTION OF THE INVENTION

Compositions of the present invention are useful as corrosion inhibitors and also as "rust converters" to be applied to metal surfaces to provide a protective coating against corrosion and to convert existing rust material to an inert material. The compositions are formulated so that they form elastic coatings upon the metal surface. The elastic coating is characterized in that the stress induced upon the coating by the deformation of the substrate is less than the yield strength of the coating. The final elastic coating is characterized by being flexible, durable, and nonodorous as opposed to the commercial rust converting formulations which form hard and brittle coatings upon the substrate metal and crack causing rust corrosion at and around the cracked area. The present invention also encompasses methods for protecting a metal substrate from corrosion over an extended period of time.

The rust inhibiting compositions contain an oxime compound as a rust converter that can react with a rusted surface to form an inert material. Preferably the composition is applied to a steel or iron-alloy metal substrate and the oxime compound reacts with any rust found upon the metal substrate to form an inert iron complex, such as magnetite.

The oxime compounds useful in the present compositions are preferably benzaldoximes and their derivatives. One such class of compounds are the salicylaldoximes. These compounds are produced by the reaction of the desired salicylaldehyde with hydroxylamine. Preferably the salicylaldoximes are substituted 2-hydroxybenzaldoximes, most preferably those that are substituted with a 5-alkyl moiety. Such compounds are described in U.S. Pat. No. 4,020,106 which is incorporated herein in its entirety. Most preferably, the oxime is 5-nonyl-2-hydroxybenzaldoxime. A commercially available salicylaldoxime solution is Atrust RC-50 manufactured by ICI Resins US (Wilmington, Mass).

Various other oxime-based rust converter compounds can also be employed in the present compositions. Examples of such oxime compounds are described in U.S. Pat. No. 4,613,384 which is herein incorporated in its entirety. The oxime can also be formulated with an anhydride, such as those oxime compositions described in U.S. Pat. No. 4,865,647 which is herein incorporated in its entirety. Further, the oxime can be complexed with a metal such as those oxime compounds described in U.S. Pat. No. 4,725,320 which is herein incorporated in its entirety.

The rust inhibiting composition containing the oxime rust converter is preferably provided as a formulation with a base carrier fluid. The base carrier fluid forms a film upon the metal surface to act as a barrier against oxygen and aqueous vapor diffusion to the metal surface. Preferably, the base carrier is a latex based paint. Typical latex paints are aqueous emulsion systems that contain polymer latex bases such as acrylic acid polymers, vinyl acrylic acid polymers and copolymers, and the like. Commercially available latex based products include Haloflex 202 manufactured by ICI Resins US. Preferably, the latex base contains a surfactant or surfactant mixture, such as commercially available HALOFLEX 202S manufactured by ICI Resins US. Also, the carrier can be chlorinated rubber binder resin bases, alkyd resin bases, epoxy resin bases, polyvinyl acetate bases, and the like.

The oxime based rust converting compound is present from about 0.1 to about 30% wt., preferably from about 0.5 to about 25% wt., more preferably from about 1 to about 15% wt. in the rust inhibiting composition.

The rust inhibiting composition is preferably formulated so as to contain a minimal, if any at all, level of fillers such as dyes, pigments, clays, carbonates, talc, phosphates, titanium dioxides, whiting agents, iron oxides, sulfates, silica, and the like. The composition contains less than 5% wt., preferably less than 1% wt., and most preferably no fillers. The composition is preferably formulated with a low percentage of organic solvents. The composition contains less than about 1% wt., preferably less than 0.5% wt., more preferably less than about 0.25% wt. potential volatile organic compounds.

The composition thus obtained forms a flexible, transparent coating upon the metal substrate surface. The thickness of the coating is generally between about 2 and 6 mils, preferably between about 3.5 and 4.5 mils, and most preferably about 4 mils. The composition is applied to the metal surface in an amount to form a coating such that upon exposure of the coated metal to ambient environmental conditions, from about 0°–100° F., the stress induced in the flexible coating by the deformation of the substrate is less than the yield strength of the coating. The deformation of the substrate can be thermally induced or mechanically induced, however, in most applications the stress is thermally induced. Although the metal surface is normally exposed only to ambient conditions, the surface temperature of the metal can exceed 100° F. and reach as high as about 150° F., such as in direct sun-light conditions.

The rust inhibiting compositions can be applied to the metal substrate surface without the need for extensive prior preparatory cleaning. Therefore, costly preparatory techniques such as cleaning, sanding, and priming the metal surface are not required prior to the application of the rust inhibiting composition; however, scrapping the surface with a wire brush to remove excess surface rust is advantageous. Preferably, the composition is in the form of a latex-based paint, containing the oxime rust converter, that is spread over the metal substrate surface. The oxime compounds in this paint composition convert any rust into an inert material, preferably magnetite. The surface of the treated metal is thereby rust-free, flexible, and provides a barrier to oxygen and moisture. The coated surface may then be covered with any type of top coat paint without evidence of "bleed through" due to the diminished levels of pigments, solvents, and fillers in the rust inhibiting composition. Subsequently, when the surface is treated to remove the coatings, upon mechanical action such as sanding or sandblasting, the resulting dust is an inert material, preferably predominately vinyl and magnetite compounds, without the presence of dyes, pigments, or lead and other fillers. Therefore, the subsequent processing is significantly less toxic and safer for disposal than previous methods.

A preferred method of protecting a metal substrate surface is followed in some cases where the surface is to be stored for an extended period of time in a rust inhibited state and where the surface is preferably shielded from ambient environmental conditions. The metal surface is optionally first cleaned, preferably with a microfilm release agent, to remove any unwanted bulk surface decayed material. Typical release agents include deodorized kerosene, $C_{4-10}$ hydrocarbons, and commercial products such as WD-40 ®. Next, the cleaned surface is coated with the rust inhibiting composition of the present invention. A mesh screening is then laid upon the composition coating, preferably before the coating dries. The mesh screening can be any type of durable screening such as fiberglass, cotton fiber, nylon fiber, or polyester material. Optionally, another coating of the rust inhibiting composition is applied to the mesh screening. The metal substrate is now in a condition for prolonged storage. In another embodiment, the mesh screening can be placed against the metal surface first, and the rust inhibiting composition applied thereto. Also, the mesh screening can be wetted with the composition prior to placement against the metal surface. When the metal substrate is again needed, the mesh coating is stripped off to expose the metal surface.

The mesh screening adds film strength to the rust inhibiting composition coating and preferably raises this film strength to a level above the adhesion strength of the coating to the metal surface, thereby allowing the removal of the coating with reduced effort and with less resultant airborne particulates of the coating material. This process of storing a metal substrate surface avoids the need to employ chemical stripping agents to expose the metal surface. Also, excessive mechanical action, such as sandblasting and grinding, is not required to expose the metal surface. Therefore, the method is environmentally safe and reduces worker exposure to hazardous materials.

The compositions of the present invention can contain minor amounts of additives. These additives do not adversely effect the elastic nature of the final dried composition coating.

Such additives include rheology modifiers that increase the viscosity of the composition. These rheology modifiers are preferably formulated to be resistant to bacteria and enzyme attack. Generally, these rheology modifiers are polymers and cellulose derivatives, such as QR-708 manufactured by Rohm and Haas Co. Typically, the compositions can contain up to about 4% wt. of a rheology modifier.

TEFLON, poly(tetrafluoroethylene), trademark of DuPont Corporation, can also be used as an additive in the compositions, preferably as TEFLON powder having an average particle size less than 80 μm. The amount of TEFLON powder is generally from 1–15% wt., preferably 1–5% wt. of the total composition. A TEF- LON additive composition is preferred for use in high wear environments.

Lubricity additives can also be employed with the compositions. Such additives are typically long chain polymer compounds having high molecular weights in the range of from 20,000 to 10,000,000. These additives reduce the drag of the coated surface and are useful in applications where high fluid flow conditions exist on the coated metal surface such as in automobiles, airplanes, and watercraft. Generally these additives are blended into the composition in up to 25% wt. of the composition, or added after the composition is applied as a separate coating. A commercial example of such an additive is POLYOX TM available from Dow Chemical.

A preferred group of additives to the compositions are surfactants for use in those situations where the metal surface is exposed to an aqueous environment, including high humidity environments. Preferred surfactants are those that act as effective wetting agents and leveling aids. These surfactants can be used in the composition in amounts from about 0.001–0.25% wt., preferably from about 0.005–0.10% wt. Preferred surfactants are nonionics such as aliphatic polyoxyethylenes having wettability values greater than 20 and a density of about 1.05 to 1.07. A preferred surfactant is ZONYL FSN TM manufactured by E.I. DuPont.

The rust inhibiting composition can be specially blended to include the latex-based paint containing the oxime compound for rust conversion and inhibition, along with TEFLON and a surfactant having a wettability value greater than 20. This composition creates a smooth surface where microorganisms and aquatic growth can not readily adhere. This composition is suited for high wear conditions in an aqueous environment such as metal pumping surfaces and watercraft hulls.

Other additives, such as zinc oxide, ammonia, and defoamers can be employed with the compositions of the present invention. Also, if necessary, an ultraviolet protective additive can be admixed with the composition, such ultraviolet protectants include 2-hydroxy-4-methoxy benzophenone-5-sulfonic acid, a commercial example being UVABSORB WP from 3-V Chemical Corp. Charlotte, NC. These additives can be used in amounts of up to about 5% wt., preferably up to about 1% wt., of the composition.

EXAMPLE 1

The elastic properties of the present rust inhibiting composition are shown by its ability to withstand longitudinal and transverse forces. The composition was prepared by blending 25% wt. ATRUST RC-50 (ICI Resins US, Wilmington, Mass.) with 75% HALOFLEX 202S (ICI Resins US). This composition was formed into a coating and allowed to dry in ambient room conditions. A 1 inch long, 0.5 inch wide, and 0.004 inch thick section of the coating was stretched by hand in the longitudinal direction. It was found that the coating could be stretched up to 140% of its original length before it would not return to its original shape. The section of the coating was also bent at a 90° angle to the horizontal and then released, repeatedly, about 2000 times, without any signs of detrimental effects to the coating.

EXAMPLE 2

The composition of Example 1 was brushed onto a 5 inch long, 3 inch wide and about 0.06 inch thick piece of low grade steel. A fine fiberglass mesh screening was placed upon the composition before it was allowed to dry. A second coating of the composition was then applied to the mesh screening. The coated metal was allowed to dry at ambient room conditions. This metal substrate was then bent repeatedly by hand at angles of about 45° off the horizon. The screen coating remained smooth and showed no signs of deterioration or cracking. The screening and coating was then removed by tearing the mesh screening off of the metal substrate. The metal surface was relatively void of the composition coating.

EXAMPLE 3

The procedures of Example 2 were repeated without the mesh screening and using only one coating of the composition. The coating showed no signs of deterioration or cracking upon bending.

The procedures of Example 2 were repeated using two commercial rust proofing product, RUST REFORMER ® manufactured by Rust-Oleum Corp and Z.R.C. manufactured by ZRC Products Inc. The coatings thus obtained showed signs of cracking after bending the metal substrate several times.

EXAMPLE 4

The composition of Example 1 was used in the Hot Salt Fog ASTM B117-73 test. Three samples were prepared for the testing. The first was prepared using one coat of the composition; the second contained two coats, applied perpendicularly; the third contained two coats, applied perpendicularly, and an alkyd test paint top coat. All three samples have passed 1500 hours of exposure with a grading of 10.

What is claimed is:

1. A rust inhibiting composition for providing a flexible, durable coating upon a metal substrate surface, consisting essentially of:
   (a) a base carrier fluid comprising a latex based paint;
   (b) an oxime compound capable of reacting with rusted metal to form an inert metal complex, wherein said oxime compound is not complexed with a metal; and
   (c) at least one additive selected from the group consisting of rheology modifiers, poly(tetrafluoroethylene), lubricity additives, surfactants, zinc oxide, ammonia, defoamers, and ultraviolet protectants, wherein the composition comprises less than about 1 weight percent of volatile organic compounds, and wherein the composition, when applied to a metal substrate surface, forms a flexible, elastic coating wherein the stress induced in the flexible coating by the deformation of the substrate is less than the yield strength of the coating.

2. The composition of claim 1 wherein the additive is a rheology modifier.

3. The composition of claim 1 wherein the additive is a surfactant.

4. The composition of claim 1 wherein the additive is poly(tetrafluoroethylene).

5. The composition of claim 1 wherein the additive is a mixture of a rheology modifier and poly(tetrafluoroethylene).

6. The composition of claim 1 wherein the additive is a mixture of a rheology modifier, poly(tetrafluoroethylene), and a surfactant.

7. The composition of claim 1 wherein the additive is a mixture of a rheology modifier and a surfactant.

8. A method of coating a metal substrate surface with a flexible, elastic coating material for inhibiting rust corrosion of the metal, comprising:

applying a rust inhibiting composition onto a metal substrate surface, the composition consisting essentially of:
(i) a base carrier fluid comprising a latex based paint;
(ii) an oxime compound capable of reacting with rusted metal to form an inert metal complex, wherein said oxime compound is not complexed with a metal; and
(iii) at least one additive selected from the group consisting of rheology modifiers, poly(tetrafluoroethylene), lubricity additives, surfactants, zinc oxide, ammonia, defoamers, and ultraviolet protectants,
wherein the composition comprises less than about 1 weight percent of volatile organic compounds, and
wherein the composition, when applied to a metal substrate surface, forms a flexible, elastic coating wherein the stress induced in the flexible coating by the deformation of the substrate is less than the yield strength of the coating.

9. The method of claim 8 wherein the additive is a rheology modifier.

10. The method of claim 8 wherein the additive is a surfactant.

11. The method of claim 8 wherein the additive is poly(tetrafluoroethylene).

12. The method of claim 8 wherein the additive is a mixture of a rheology modifier and poly(tetrafluoroethylene).

13. The method of claim 8 wherein the additive is a mixture of a rheology modifier, poly(tetrafluoroethylene), and a surfactant.

14. The method of claim 8 wherein the additive is a mixture of a rheology modifier and a surfactant.

15. A method of coating a metal substrate surface with a flexible, elastic coating material for inhibiting rust corrosion of the metal, comprising:
(a) placing a mesh screening onto a metal substrate surface;
(b) applying a rust inhibiting composition onto the metal substrate surface and the mesh screening, the composition consisting essentially of:
(i) a base carrier fluid comprising a latex based paint;
(ii) an oxime compound capable of reacting with rusted metal to form an inert metal complex, wherein said oxime compound is not complexed with a metal; and
(iii) optionally, at least one additive selected from the group consisting of rheology modifiers, poly(tetrafluoroethylene), lubricity additives, surfactants, zinc oxide, ammonia, defoamers, and ultraviolet protectants; and
(c) optionally, applying a second coating of the composition to the metal substrate surface and the mesh screening;
wherein the composition comprises less than about 1 weight percent of volatile organic compounds, and
wherein the composition, when applied to a metal substrate surface, forms a flexible, elastic coating wherein the stress induced in the flexible coating by the deformation of the substrate is less than the yield strength of the coating.

16. The method of claim 15 wherein the additive is a rheology modifier.

17. The method of claim 15 wherein the additive is a surfactant.

18. The method of claim 15 wherein the additive is poly(tetrafluoroethylene).

19. The method of claim 15 wherein the additive is a mixture of a rheology modifier and poly(tetrafluoroethylene).

20. The method of claim 15 wherein the additive is a mixture of a rheology modifier, poly(tetrafluoroethylene), and a surfactant.

21. The method of claim 15 wherein the additive is a mixture of a rheology modifier and a surfactant.

22. The composition of claim 1 wherein the composition contains less than 1% wt. fillers selected from the group consisting of dyes, pigments, clays, carbonates, talc, phosphates, titanium dioxide, whiting agents, iron oxides, sulfates, and silica.

23. The method of claim 8 wherein the composition contains less than 1% wt. fillers selected from the group consisting of dyes, pigments, clays, carbonates, talc, phosphates, titanium dioxide, whiting agents, iron oxides, sulfates, and silica.

24. The method of claim 15 wherein the composition contains less than 1% wt. fillers selected from the group consisting of dyes, pigments, clays, carbonates, talc, phosphates, titanium dioxide, whiting agents, iron oxides, sulfates, and silica.

* * * * *